Nov. 24, 1931.  W. DUBILIER  1,833,392
ELECTRICAL CONDENSER
Filed Dec. 29, 1925   3 Sheets-Sheet 2
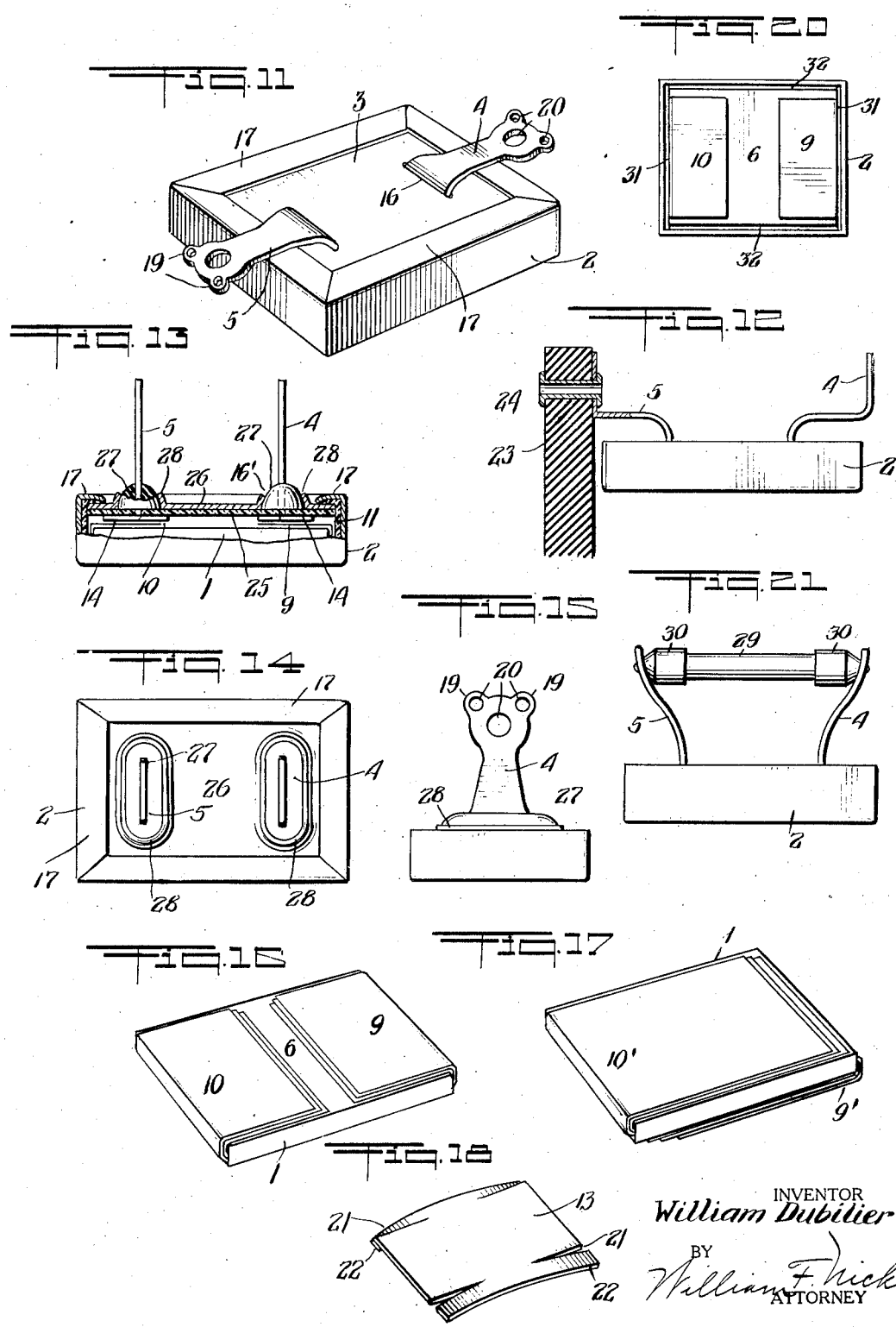

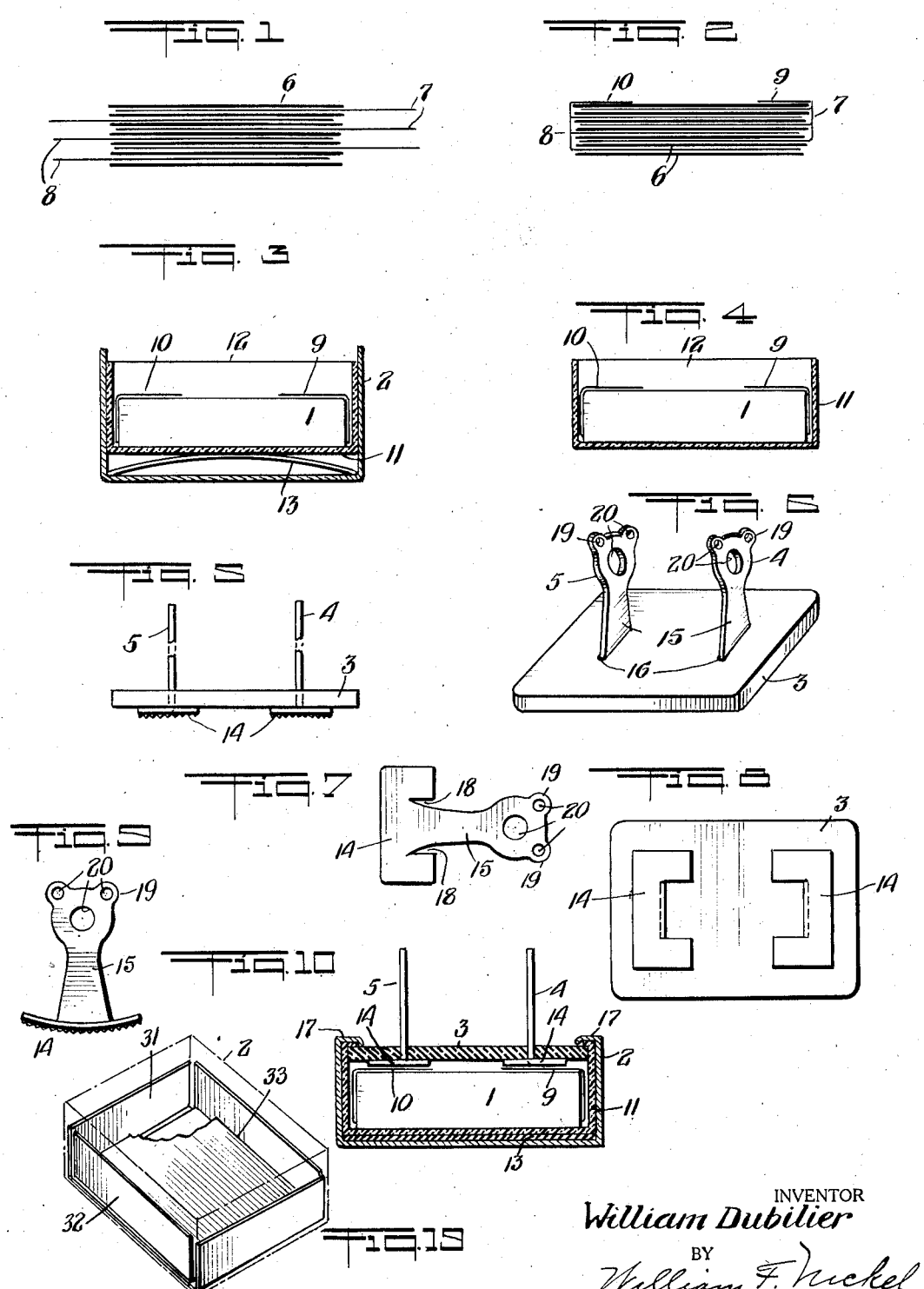

Nov. 24, 1931.     W. DUBILIER     1,833,392
ELECTRICAL CONDENSER
Filed Dec. 29, 1925     3 Sheets-Sheet 3
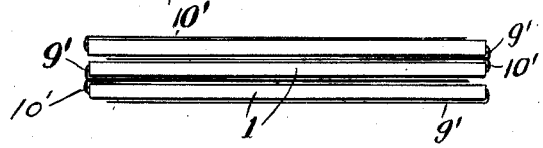
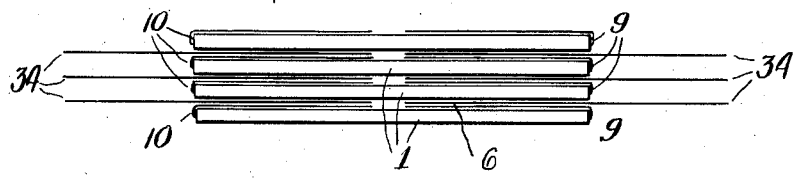
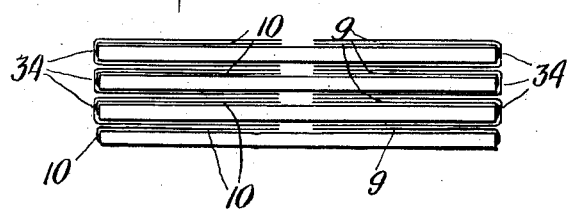

Patented Nov. 24, 1931

1,833,392

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

ELECTRICAL CONDENSER

Application filed December 29, 1925. Serial No. 78,193.

This invention relates to improvements in electrical condensers; especially electrical condensers that are intended to have a constant or fixed capacity.

An object of this invention is to provide a condenser which can be inexpensively produced; which is well encased in a protective housing; which is equipped with permanent terminals adapted to enable the condenser to be mounted in position or connected in circuit as desired; and which is efficient and durable in use.

Another object of the invention is to provide a condenser which permits the employment of the same parts for various capacities, the only change for an alteration of capacity being in the number of electrically conductive elements or metal sheets, with intermediate sheets of insulation required to form the stack or body of the condenser.

A further object is to provide for the use and incorporation in the condenser, of a complete stack or body of any desired size or capacity, to be made up and handled as a structurally independent member or unit.

Yet another object is to provide novel and convenient method of making a condenser by assembling the stack or body thereof in sections or units, adapted to effect proper connection of the conductive parts of the condenser upon being placed in position.

A still further object is to provide a practical, efficient, rapid and economical process or method of making in quantity a condenser according to my invention.

Other objects and advantages of my invention will be apparent from the description which follows, and the novel features of the invention will be pointed out in the appended claims. But this disclosure is illustrative only; and I may vary the details of structure shown herein without departing from the nature or essential character of the invention, or exceeding the scope and purport of the appended claims.

Figure 1 is a side view of a stack comprising conductive elements such as sheets of metal foil separated by sheets of insulation such as mica, for use in a condenser according to my invention; this view showing part of the sheets of metal foil projecting out from one end of the stack, and part projecting at the other;

Figure 2 is a side view of such a stack when finished with the projecting ends of the sheets of metal foil folded down against the outside of the stack;

Figure 3 is a longitudinal sectional view of a receptacle in which the stack is placed, this receptacle containing a lining to cover the stack and keep it from making contact with the receptacle when the latter is made of metal;

Figure 4 is a side view showing the stack enveloped by the lining, the lining appearing in section;

Figure 5 is a side view of a closure for the receptacle, this closure carrying the terminals of the condenser;

Figure 6 is a perspective view of the closure and terminals;

Figure 7 is a plan view of a blank or strip of metal shaped to be bent to provide the terminals of the condenser;

Figure 8 is a bottom plan of the closure for the condenser with terminals carried thereby;

Figure 9 is a front view of one of the terminals;

Figure 10 is a longitudinal sectional view of the complete condenser with the lining, the stack inside of the receptacle, and the closure in position; and the terminals connected to the sheets of metal foil of opposite polarity projecting through the closure;

Figure 11 is a perspective view of a condenser according to my invention as it appears when finished;

Figure 12 is a view showing how the terminals of the condenser can be employed to mount or support the condenser, as well as to enable it to be joined to conductors and thus connected in an electrical circuit;

Figure 13 is a view similar to Figure 10, showing a modification of a condenser according to my invention;

Figure 14 is a top view thereof;

Figure 15 is an end view of same;

Figures 16 and 17 are perspective views showing different ways in which the stack can be made up to be handled as a separate unit in the manufacture and assembling of the condenser;

Figure 18 is a perspective view showing a detail;

Figure 19 is a perspective view indicating diagrammatically another method of assembling a condenser according to my invention;

Figure 20 is a top view of what appears in Figure 19;

Figure 21 shows how the terminals of the condenser can support a grid leak resistance member;

Figure 22 shows how the units of Figure 17 can be assembled and connected to form the body or stack of a condenser, and Figures 23 and 24 show how the sections or units of Figure 16 can be assembled for the purpose.

The same numerals identify the same parts throughout.

In the particular description of the structure of my improved condenser, I shall refer first to Figure 10 which shows the condenser as comprising a stack 1, in a receptacle 2; this receptacle being preferably of metal open at the top to receive a closure 3. This closure is here illustrated as being of insulation, and it has terminals 4 and 5 projecting through it, these terminals being in contact with electrically conductive elements of different polarity in the stack 1. The stack is prevented from making contact with the inside of the receptacle 2 by means of a lining of insulating material which envelopes the stack, and the stack is held firmly under compression in the receptacle 2 by bending over the upper edge or rim of the receptacle upon the outer face of the closure 3 around the periphery thereof.

To form the stack, I take a number of sheets of mica 6 and sheets of metal foil 7 and 8 and lay them upon one another as shown in Figures 1 and 2. The top and bottom sheets or layers 6 of the stack are of mica or some other insulation and a sheet of insulation is laid between each two adjacent sheets of metal foil to separate them from each other. The sheets of foil 7, in practice, will be of one polarity and project at one end of the stack, while the sheets of metal foil 8 which will be in alternation with the sheets of foil 7, will be of opposite polarity and project from the other end of the stack 1. The projecting ends of the sheets of foil 7 and 8 can then be bent or folded against the upper face of the stack as in Figure 2 and the stack so constituted can be subjected to pressure, placed in a container from which the air is exhausted in order to draw out all the air on the inside of the stack, and then immersed in a bath of liquid insulation such as melted wax. This wax will impregnate the condenser, filling any small spaces which may not be entirely closed by the pressure upon the stack and covering the whole stack with a wax layer which will prevent the entrances of air and moisture. The finished stack will then appear as shown in Figures 2 and 16 and the stack can be handled as a separate and independent unit in the production of the condenser.

In the old method of making such units, the armatures or foils 7 and 8 would be stacked up with the insulation 6 and if necessary compressed and waxed. When the armatures were made of thin tin-foil and especially when there were only a small number of sheets projecting as would be required for the lower capacities, the armatures would easily break off at the edge of the mica or other insulating material used when the unit was subjected to handling. This drawback is well-known to one skilled in the art and is overcome in my construction as shown in Figures 2 and 16.

None of the foils 7 or 8 project, but are firmly compressed against the outer face of the stack, and are, therefore, not liable to break or be torn off. Of course, the number of sheets of metal foil and mica in the stack, will vary according to the capacity desired; and the larger the number of foils present, the greater the capacity which the condenser will possess.

The receptacle 2 can be made by punching it out of metal and can be of the same size and of uniform depth for stacks of various thicknesses and condensers of various capacities. For a relatively thin stack, in a condenser of small capacity, the receptacle can be partly filled as by putting a block or a piece or several layers of insulation on the bottom, so that regardless of the thickness of the stack, the top face thereof will always be the same distance below the upper edge or rim of the receptacle for the proper folding over of the rim on the closure 3. Each stack can be made up according to the capacity required, measured for capacity, adjusted, and then mounted in the receptacle 2.

The lining for the inside of the receptacle is indicated by the numeral 11 and it may be in the form of a shallow pouch or bag, having an opening or mouth 12 through which the stack 1 is inserted. This lining 11 may, if desired, have simply the form of a sheet cut and fitted to line, and cover the bottom of the box or receptacle 2, and the inner faces of its four sides, or it may be simply a strip extending round the inner faces of the four sides. When the stack is enveloped by this lining, with the projecting portions of the foil sheets therein folded down upon the outside of the stack, the folded down ends 9 and 10 of the foil sheets 7 and 8 will be exposed through the mouth 12. The lining 11 may be of sheet rubber, varnished cloth or wax paper or any other suitable insulating material; and in the receptacle 2, the stack 1 will not only be kept out of contact with the inside surface of this metal casing by t¹ lining 11, but it will also be impelled upward to some extent, towards the rim or edge of the receptacle by a leaf spring 13, disposed upon the bottom of the receptacle so that its convex face will engage that portion of the lining 11 which covers the bottom of the stack 1, or the bottom insulating sheet 6, if the lining goes only around the sides in the receptacle 2. The spring 13 may be simply a plate of thin metal bent or sprung to the required extent, and the rim of the receptacle 2 must be turned down so as to force the stack down towards the bottom of the receptacle far enough to make this spring as nearly flat as possible. When assembling the condenser, the lining 11 may be put into the receptacle 1, and then the stack inserted, or the stack may be covered by the lining as in Figure 3, and the two put into the receptacle together.

The closure 3 as shown in Figures 5, 6, 8, 10, and 11 is in the form of a plate of insulation, such as bakelite of the required thickness. The terminals 4 and 5 which it carries each comprise a base 14 and a shank 15, the shank being at right angles to the base and passing through slots 16 in the closure, while the bases or feet 14 engage the inner face of the closure 3 and rest upon the projecting folded over ends 9 and 10 of the sheets of foil 7 and 8. Thus the terminal 4 makes contact with the portions 9 of the projecting ends of the foil sheets 7, and the terminal 5 likewise makes a good contact with the folded over portions 10 of the projecting ends of the foil sheets 8. The bent over portions of the rim of the receptacle 2 are indicated at 17 and are folded down against the outer face of the cover or closure 3 all around its periphery and they grip this closure firmly, maintaining the stack 1 under compression of the required degree between the feet 14 of the terminals and the spring member 13 in the bottom of the receptacle. Preferably the edges of the lining 11 are folded over the edges of the cover, and pressed tightly against the outer face thereof by the edges 17 of the receptacle 2.

Each terminal can be stamped or punched out of the piece of metal and be given the form shown in Figure 7. Cuts 18 in one side of the base 14 enable the shank to extend up at right angles from substantially the middle of the base when it is bent as required, and I may shape each base or foot 14 of the terminals so as to bow it slightly as indicated in Figure 9; that is, the base is so formed as to present a convex surface toward the folded over portions 9 and 10 of the foil sheets. Then as the rim 17 of the receptacle 2 is bent over to grip the closure 3 with sufficient pressure, both the feet 14 and the spring 13 can be pressed out flat or nearly flat and the stack 1 is thus held under pressure on both faces, due to the stress in the feet 14 and the spring in the bottom of the receptacle. The shanks 15 of the terminals 4 and 5 can have projections 19 at their outer ends and apertures 20 to enable them to be conveniently joined to the conductors of an electrical circuit. The spring 13 may be either a plate or sheet of metal bowed throughout, or as shown in Figure 18, it may have longitudinally extending tongues 22 at each corner which are bowed or sprung, the remainder of this element being flat. When the feet 14 of the terminals 4 and 5 are bowed the spring 13 may be omitted, and when the spring 13 is used the feet 14 need not be bowed; or if desired, the feet 14 of the terminals may be bowed and used in combination with the spring plate 13, and when either or both features are present, the receptacle is made to clamp the stack and cover 3 tightly together and press the bowed parts out flat, to bind the sheets of mica and foil securely in contact with one another. The faces of the feet 14 may be milled or roughened to give good contact with ends 9 and 10.

The entire condenser when finished will thus be very compact, strong and durable. The stack 1 is securely protected against damage and the effects of rough handling and it is kept under continuous pressure sufficient to maintain the sheets of metallic foil and mica in close contact, so that no changes in capacity can take place. The receptacle 2 and closure 3 make a full casing or housing which is substantially sealed against the entrance of moisture or any other foreign substance. The receptacle 2 also acts as a metallic clamping member to hold the stack and cover together and flatten out the feet 14 and the spring 13, or either, when these parts are not employed in unison.

The terminals 4 and 5 are strong but springy and they can be bent into position parallel with the closure 3 as indicated in Figure 11, or in any other manner for mounting the condenser or connecting it in circuit. For example, the condenser might be supported as in Figure 12 whereon 23 indicates a panel and 24 an eyelet rivet passing through the aperture 20 of one terminal, to secure the condenser on the panel. With the terminals bent as shown in Figures 11 and 12, the lower part of the shank 15 of each terminal, will be perpendicular to the closure 3 and on account of the short length of this portion and relatively great breadth, it will withstand a good deal of force tending to deform it. Hence, the utility of these terminals in supporting the condenser as desired, as well as connecting it to the circuit in which it is to operate.

This type of condenser is thus specially adapted to be mounted in a position the reverse of that shown in Figures 10, 11 and 12, for example; that is, with the bottom of the receptacle 2 up, and the terminals 4 and 5 and plate 3, underneath. The cover 3 then serves as a base for the stack 1, the parts 4 and 5 as mounting lugs, and the receptacle 2 as a metal enclosure or housing.

Figures 13, 14 and 15 show a similar condenser, but with some modifications. In these three views, the relatively thick sheet of insulation or bakelite 3 is replaced by a sheet of mica 25, through which passes the shanks 15 of the terminals 4 and 5, and the closure plate is a plate of metal 26 over which the rim 17 of the receptacle 2 is bent. This metal plate has parallel slots 16' of some width and the slots in question are filled with rubber bushings 27, which fit into the openings 26 and rest on the mica plate 25, and are slotted the same as the plate 3 and mica sheet 25 to allow the terminals 4 and 5 to pass through them. The bottoms of these bushings 27 are flat, but the tops are convex, so that they project or bulge through the openings 16' above the outer surface of the metal plate 26, and the edges of these slots 16' may be raised a little as indicated at 28 to fit around the upper convex surfaces of the bushings 27 and hold them firmly in place against the sheet of mica 25. These rubber bushings may be suitably hardened and cement may also be employed to hold them in place in the openings or slots 16'. This condenser, too can be mounted with the bottom up, so that the plate 26 acts as a base, and terminals 4 and 5 as lugs for mounting.

In both these forms of condensers, the sheets of metal foil are kept out of contact with the metallic receptacle 2 by means of the lining 11. Sometimes, however, this metallic receptacle can be used as one terminal of the condenser. Then part of the sheets of metal foil will be arranged to have electrical contact with the inside surface of this receptacle; while the remaining sheets of metal foil will be connected to a terminal such as the terminal 4 or 5 projecting through the closure of the receptacle. When such a result is wanted, the stack may be made up as indicated in Figure 17, whereon the folded ends 9' of part of the sheets of foil, are turned down against one face of the stack, and the folded ends 10' of the other sheets are turned down against the opposite face of the stack. Or the condenser in Figure 10 may be modified so as to expose the ends 9' through the lining 11, on the bottom of the receptacle, and the bottom of the receptacle may carry a bushing 27 and terminal projecting therethrough and joined to the ends 9'.

The receptacle 2 can, of course, be cut at the corners, so that the rim 17 which is folded down upon the closure, will be of the proper width and the ends of these portions can be trimmed at the ends or corners to prevent overlapping.

The use of the lining 11 makes the stack effectually moisture-proof.

Figures 19 and 20 show the receptacle 2 (in dotted lines in the former view), with a sheet of insulating material 31 of the same substance as the lining 11, laid on the bottom of the receptacle with its opposite ends turned up and in contact with the inner faces of the two opposite ends or sides of the receptacle. Across the sheet 31 is laid a sheet of metal foil 32, with its ends upturned and in contact with the inner faces of the two remaining opposite sides of the receptacle. On the sheet of foil 32 is placed a flat sheet of mica or other insulation 33. When the stack 1 is placed in the receptacle 2, its protruding foil ends 9 and 10 will be prevented from making contact with the receptacle by the upturned ends of the sheet of insulation 31 and these ends will also be out of contact with the foil ends 9 and 10 because the sheets of mica 6 are wider than the sheets of foil 7 and 8, as clearly appears in Figure 20. Hence if the receptacle should ever be at a potential, the strip 31 will never be subjected to an electrostatic stress, because the foil 32, in contact with the receptacle, will always ensure the same potential on both faces of the strip 31. Thus the insulation losses in the condenser are reduced. In this form, of course, a spring plate 13 may be put in the receptacle 2 under the strip 31, and the condenser in other respects may have the features already described.

Figure 21 shows the terminals 4 and 5 mounting an ordinary grid leak resistance comprising a resistance element in a tubular sleeve 29, with conical terminal caps 30, engaging the openings 20 in the terminals. The terminals are bent to set a predetermined distance apart and resiliently engage the ends of the resistance. To mount the grid leak, the terminals are simply separated with the fingers far enough to slip the ends of the caps 30 into the openings 20, and then released; whereupon the terminals spring back and hold the grid leak. This view indicates further the utility of the flexible terminals 4 and 5.

While the terminals 4 and 5 and the foils 9 and 10 are indicated as spaced slightly apart in Figures 10 and 13 for the sake of clearness in illustration, they will of course, be held tightly together in practice, and the foil ends 9 and 10 be pressed firmly against the top of the stack 1.

If the condenser is to be of small capacity, two or more sections or units may be combined and enclosed in the receptacle 2. For example, several sections or units of the kind shown in Figure 17 may be utilized in the manner shown in Figure 22, which presents several of these sections one upon the other, with, say, the foil ends 10' of the one section in contact with the foil ends 9' of the next section, and the foil ends 10' of this next section making contact with the foil ends 9' of a further section. These sections which are shown as three in number in this figure, are thus connected in series and the terminals of the entire stack are thus the foil ends 10' at one end, and the foils 9' at the other. Any number of such sections or units can be combined or superposed so as to put them in series in this way.

If the condenser is to be made up with several sections in parallel, a number of sections or units of the type shown in Figure 16 are taken and combined in the manner illustrated in Figures 23 and 24. Here the foil ends 9 and 10 of each section are folded down upon the same face of the unit as already described. The units are placed one upon or against the other, and the folded over foil ends 9 and 10 of each section would ordinarily make contact with the sheet of mica 6 on that face of the adjacent section against which the foil ends thereof are not folded. Therefore, the foil ends 9 and 10 of each section must be suitably connected together. For this purpose, I place between the folded ends 9 and 10 of each section, and the adjacent section, a pair of pieces of metal foil or some other suitable material 34. One piece of such foil thus connects with the folded over foil ends 9 of the adjacent section, and another piece of such foil connects with the folded over ends 10 of such section, as shown in Figure 23. As the sections are put together by laying them against one another or superposing them upon one another, the connecting parts or pieces of foil 34 in contact with the folded over foil ends 9 and 10 of each section, are bent up over the ends of the adjacent section and down into contact with the folded over foil ends 9 and 10 of said section. Then all of the sections are connected in multiple and the terminals 4 and 5 which made contact with the folded over foil ends 9 and 10 of the topmost section are also in circuit with all of the other sections of the stack.

Having described my invention, what I believe to be new and desire to secure by Letters Patent of the United States is:—

1. In an electrical condenser, a bowed spring compression member having longitudinal cuts in its ends to provide bent tongues at the corners of said member.

2. An electrical condenser comprising a casing, a stack of armatures separated by dielectric material within the casing, a sheet of insulation overlying the stack, a metallic cover for the casing engaged by the rim of said casing, said cover having openings therein, and terminals passing through said insulating sheet and openings, said terminals having spring means to maintain electrical contact with the condenser armatures.

3. An electrical condenser comprising a casing, a stack of armature elements separated by dielectric material within the casing, a metallic cover for the casing engaged by the rim of the casing and having openings therein, and terminals passing through said openings, means for insulating the cover from the stack, the cover being clamped against the stack to exert pressure thereon, and the terminals being maintained in electrical contact with the armature elements by the pressure exerted on the stack.

4. An electrical condenser comprising a metallic casing, a stack of armature elements separated by dielectric material within the casing, means for insulating said stack from the casing, a closure member for the casing, terminals for the condenser projecting through the closure and contacting with said armatures, a spring member in the casing, a rim of said casing bent over against the closure member to compress the stack within the casing, the terminals being maintained in good electrical contact with the armatures by the pressure exerted on the stack.

5. A stack for an electrical condenser comprising a plurality of sections, each of said sections including armature sheets separated by dielectric sheets with portions of the armatures projecting from the section at different points, said projecting portions being folded over against opposite faces of the section, each of said sections having its said folded portions in contact with the folded portions of an adjacent section to connect the same in circuit relation.

In testimony whereof I affix my signature.

WILLIAM DUBILIER.